United States Patent
Cantoni et al.

(10) Patent No.: US 11,724,675 B2
(45) Date of Patent: Aug. 15, 2023

(54) AUTOMATICALLY CONTROLLED BRAKING SYSTEM

(71) Applicant: FRENI BREMBO S.p.A., Bergamo (IT)

(72) Inventors: Carlo Cantoni, Bergamo (IT); Roberto Arienti, Bergamo (IT); Massimo Gualandris, Bergamo (IT); Pierangelo Gherardi, Bergamo (IT)

(73) Assignee: Brembo S.p.A., Bergamo (IT)

( * ) Notice: Subject to any disclaimer, the term of this patent is extended or adjusted under 35 U.S.C. 154(b) by 108 days.

(21) Appl. No.: 14/999,726

(22) PCT Filed: Dec. 17, 2014

(86) PCT No.: PCT/IB2014/067002
§ 371 (c)(1),
(2) Date: Jun. 15, 2016

(87) PCT Pub. No.: WO2015/092700
PCT Pub. Date: Jun. 25, 2015

(65) Prior Publication Data
US 2016/0355166 A1     Dec. 8, 2016

(30) Foreign Application Priority Data

Dec. 19, 2013   (IT) .......................... 10201390229201

(51) Int. Cl.
*B60T 8/40*        (2006.01)
*B60T 8/17*        (2006.01)
(Continued)

(52) U.S. Cl.
CPC ............ *B60T 8/1706* (2013.01); *B60T 7/042* (2013.01); *B60T 7/085* (2013.01); *B60T 7/102* (2013.01);
(Continued)

(58) Field of Classification Search
CPC ...... B60T 8/1706; B60T 8/4266; B60T 11/20; B60T 7/042; B60T 7/085; B60T 8/4863; B60T 2270/10; B60T 2270/82
See application file for complete search history.

(56) References Cited

U.S. PATENT DOCUMENTS 5,152,588 A * 10/1992 Bright .................... B60T 8/365
                                                                188/162
6,634,724 B2    10/2003 Kobayashi et al.
(Continued)

FOREIGN PATENT DOCUMENTS

| DE | 102007016864 A1 | 10/2008 | |
| DE | 102012222058 A1 * | 6/2014 | ............. B62L 3/023 |
| EP | 152344 A * | 8/1985 | |

OTHER PUBLICATIONS

Machine translation of DE 10 2012 222 058, retrieved Sep. 16, 2017.*

(Continued)

*Primary Examiner* — Bradley T King
(74) *Attorney, Agent, or Firm* — Marshall & Melhorn, LLC

(57) ABSTRACT

A braking system for vehicles comprising —a manual actuator device, operable by means of a lever and/or pedal, operatively connected to at least a first braking device acting on a brake disc or drum, so as to exercise a braking action, —an automatic actuator device, operatively connected to said manual actuator device and/or to said first braking device, —at least one command panel which supervises the functioning of the braking system, said command panel being operatively connected to the automatic actuator device and being programmed so that when the manual actuator device is operated, the panel commands the operation of the automatic actuator device so as to be able to: —increase the overall braking action of the braking system, further oper- (Continued)

ating the first braking device or further braking devices provided in said system and acting on further brake discs or drums, —control the braking action of the braking system so as not to further operate the first braking device or further braking devices of the system, —reduce the overall braking action imposed by means of the manual actuator device, directly countering the thrust action exercised on the lever and/or on the pedal.

15 Claims, 4 Drawing Sheets

(51) Int. Cl.

| | |
|---|---|
| *B60T 8/48* | (2006.01) |
| *B60T 7/04* | (2006.01) |
| *B60T 7/08* | (2006.01) |
| *B60T 8/32* | (2006.01) |
| *B60T 13/74* | (2006.01) |
| *B60T 13/68* | (2006.01) |
| *B60T 11/16* | (2006.01) |
| *B60T 11/10* | (2006.01) |
| *B60T 7/10* | (2006.01) |
| *B60T 8/42* | (2006.01) |

(52) U.S. Cl.
CPC .............. *B60T 8/32* (2013.01); *B60T 8/4004* (2013.01); *B60T 8/4863* (2013.01); *B60T 11/101* (2013.01); *B60T 11/16* (2013.01); *B60T 13/686* (2013.01); *B60T 13/745* (2013.01); *B60T 8/4233* (2013.01); *B60T 8/489* (2013.01); *B60T 2270/10* (2013.01); *B60T 2270/82* (2013.01)

(56) References Cited

U.S. PATENT DOCUMENTS

| | | | |
|---|---|---|---|
| 7,794,026 B2 * | 9/2010 | Nakayama | ............ B60T 8/1706 |
| | | | 303/113.1 |
| 8,046,149 B2 | 10/2011 | Nanri et al. | |
| 2010/0114444 A1 | 5/2010 | Verhagen et al. | |
| 2017/0028973 A1 * | 2/2017 | Arienti | ................. B60T 8/1706 |

OTHER PUBLICATIONS

European Patent Office, Italian Search Report IT 10201390229201 (IT-T020131049); dated Oct. 2, 2014, 2 pages, European Patent Office, Munich, Germany.
European Patent Office, International Search Report and Written Opinion of PCT/IB2014/067002; dated Sep. 17, 2015, 8 pages, European Patent Office, Rijswijk, Netherlands.

* cited by examiner

AUTOMATICALLY CONTROLLED BRAKING SYSTEM

FIELD OF APPLICATION

The present invention relates to an automatically controlled braking system, in particular for vehicles and the relative method of operation and control.

STATE OF THE ART

In particular, in the field of braking systems for vehicles, it is known of to provide control devices of the braking force imposed by the user acting on the relative manual controls such as levers and/or pedals.

Such control devices have for example a function of preventing that on account of an excessive braking action requested by the user, the vehicle may incur in the blocking of one or more wheels which would compromise the stability and control of the same.

In addition, said control devices can be efficiently used for a dynamic control of the vehicle stability: it is indeed known that by applying an appropriate braking force to individual wheels, or for example by changing the distribution of the braking force on different axles of the vehicle (whether with two, three, four or more wheels), it is possible to generate yaw moments able to correct the trajectory of the vehicle, improving the dynamic control thereof.

PRESENTATION OF THE INVENTION

The solutions of the prior art typically provide anti-blocking systems, known by the name of ABS systems, which act substantially on the pressure of the hydraulic circuit of the braking system so as to reduce the hydraulic pressure and thus the braking force on each wheel subject to momentary blocking. The same function is used to variably divide the braking force between different axles of the vehicle.

It is also known of to use systems in which the user creates a pressure acting on the manual control and a control system interprets such pressure request transforming it into the corresponding pressure and braking action in the connected braking system. This way, the user never has direct control of the braking system, but there is always a controller with corresponding actuators which translates the manual action of the user into a corresponding hydraulic pressure and braking action in the connected braking system.

Such known systems, while on the one hand making it possible to avoid the blocking of the wheels and/or to perform a stability control of the vehicle, on the other never give the user a clear and precise feeling of control of the vehicle.

In other words, the user does not perceive the intervention of the braking correction made by the system, but merely provides a braking request which is in turn processed by the control unit.

As a result, the known systems are certainly effective but do not actually give the user the sensation of full controlling the vehicle. This feeling of complete control can be extremely useful in extreme situations, such as when a motor vehicle enters a bend with the brakes clamped: in such conditions not having a full perception of the actual braking torque transmitted to the front of the vehicle may result in a sudden loss of control of the vehicle and in falls.

The need is therefore felt to resolve the drawbacks and limitations mentioned with reference to the prior art.

In particular the need is felt to make available a braking system which is effective in controlling the braking of the wheels in all conditions of use, avoiding dangerous blocking, and which makes it possible to act effectively on the control of the stability of the vehicle, always giving the user a precise feedback on the actual control of the braking/stability, so as to significantly improve the sensation of control, i.e. the user's confidence in the vehicle.

Such need is satisfied by a braking device according to claim 1.

In particular, such requirement is met by a braking system for vehicles comprising a manual actuator device, operable by means of a lever and/or pedal, operatively connected to at least a first braking device acting on a brake disc or drum, so as to exercise a braking action, an automatic actuator device, operatively connected to said manual actuator device and/or to said first braking device, at least one command panel which supervises the functioning of the braking system, said command panel being operatively connected to the automatic actuator device and being programmed so that when the manual actuator device is operated, the panel commands the operation of the automatic actuator device so as to be able to:

generate a braking action or increase the overall braking action of the braking system operating and/or increasing the operation of the first braking device or further braking devices provided in said system and acting on further brake discs or drums, control the braking action of the braking system so as not to further operate the first braking device or further braking devices of the system, reduce the overall braking action imposed by means of the manual actuator device, directly countering the thrust action exercised on the lever and/or on the pedal.

According to a possible embodiment of the present invention, the command panel is programmed to command the automatic actuator device so as to operate the first braking device simultaneously with the manual operation imposed by the manual actuator device or by further braking devices provided in said system, when, following the manual operation of the manual actuator device, no blocking phenomena of the brake disc or drum occur.

According to a possible embodiment of the present invention, the command panel is programmed to command the automatic actuator device so as not to operate the first braking device or further braking devices provided in said system, when, following the manual operation of the manual actuator device, blocking phenomena of the brake disc or drum occur.

According to a possible embodiment of the present invention, the command panel is programmed to command the automatic actuator device so as to directly contrast the action of the manual actuator device opposing the thrust action of the lever or pedal, when, following the operation of the manual actuator device, blocking phenomena of the brake disc or drum occur.

According to a possible embodiment, the command panel is programmed to command the automatic actuator device so as to generate a braking action by operating the first braking device or further braking devices of the system, so as to stabilise the dynamics of the associable vehicle, and exclude the manual operation of the braking devices by the user.

According to a possible embodiment of the present invention, the manual actuator device is operatively connected to at least a first pusher of the first braking device and the automatic actuator device is operatively connected to at least a second pusher of the first braking device, said first and second pushers operating on the same brake disc or drum.

According to a possible embodiment of the present invention, the manual actuator device is operatively connected to at least a first pusher of the first braking device and the automatic actuator device is operatively connected to at least a second pusher of a second braking device, said first and second pushers operating on separate brake discs or drums mechanically connected in rotation to each other.

According to a possible embodiment of the present invention, the manual actuator device is operatively connected to at least a first pusher of the first braking device and the automatic actuator device is operatively connected to at least a second pusher of a second braking device, said first and second pushers operating on separate brake discs or drums mechanically separate from each other and rotatably connected to different wheels of an associable vehicle.

According to a possible embodiment of the present invention, the command panel is programmed to command the automatic actuator device so as to operate the second braking device so as to stabilise the vehicle, following the manual operation of the manual actuator device acting on the first braking device.

According to a possible embodiment of the present invention, the automatic actuator device comprises contrast means acting in opposition to the thrust of the lever or pedal.

According to a possible embodiment of the present invention, the contrast means act on the lever or pedal so as to oppose the increase in the stroke of the lever or pedal or to reduce said stroke.

According to a possible embodiment of the present invention, the lever or pedal pushes a piston fluidically connected to a hydraulic operating circuit of at least a first pusher of the first braking device, and the contrast means, when operated, interrupt the fluidic connection between the piston and the at least one first pusher.

According to a possible embodiment of the present invention, the lever or pedal pushes a piston fluidically connected to a hydraulic operating circuit of at least a first pusher of the first braking device, and the contrast means, when operated, exert a thrust on the piston in opposition to the operating stroke.

According to a possible embodiment of the present invention, the contrast means comprise a hydraulic device which generates a pressure acting on the piston in opposition to the operating stroke caused by the movement of the lever or pedal.

According to a possible embodiment of the present invention, the contrast means comprise mechanical devices connected to the lever or pedal or to kinematisms connected to the lever or pedal so as to exercise a counter action such as to prevent the increase of the operating stroke or to reduce said stroke.

According to a possible embodiment, the contrast means are predisposed so as to exclude the manual operation of the braking devices by the user, and to command the operation of the first braking device or further braking devices of the system, so as to stabilise the dynamics of the associable vehicle, regardless of the manual action of the manual actuator device on said pedal or lever.

According to a possible embodiment, the contrast means are configured so as to exclude the hydraulic connection between the manual actuator device and the braking devices, and to hydraulically connect the braking devices exclusively to at least one automatic actuator device so as to command the braking devices for the dynamic stabilisation of the associable vehicle, preventing the manual operation of the braking devices.

According to a possible embodiment of the present invention, the system comprises
  a manual actuator device, operable by means of a lever and/or pedal, operatively connected to at least a first braking device acting on a brake disc or drum on a first axle of an associable vehicle, so as to exercise a braking action,
  an automatic actuator device, operatively connected to said manual actuator device and/or to said first braking device,
  at least one command panel which supervises the functioning of the braking system, said command panel being operatively connected to the automatic actuator device and being programmed so that when the manual actuator device is operated, the panel commands the operation of the automatic actuator device so as to be able to:
  increase the overall braking action of the braking system, further operating the first braking device or further braking devices provided in said system and acting on further brake discs or drums,
  control the braking action of the braking system so as not to further operate the first braking device or further braking devices of the system,
  reduce the overall braking action imposed by means of the manual actuator device, directly countering the thrust action exercised on the lever and/or on the pedal; in addition the system comprises
  at least a second manual actuator device, operatively connected to the first manual actuator device by means of an interposed braking balancing device, so as to be operated when the first manual actuator device is operated, the second manual actuator device, operating at least a second braking device acting on a drum brake disc on a second axle of the associable vehicle, separate from a first vehicle axle on which the first braking device 16 acts, operated by the first manual actuator device,
  wherein the automatic actuator device, by means of said command panel, commands the adjustment of the balancing device so as to regulate and vary the operation of the second manual actuator device in relation to the first manual actuator device.

According to a possible embodiment of the present invention, the braking devices comprise a caliper of a disc brake and/or a drum.

According to a possible embodiment of the present invention, the manual actuator device, and/or the braking devices and/or the automatic actuator device comprise hydraulic type pressurised fluid operators.

According to a possible embodiment of the present invention, the braking system for vehicles is controlled according to a control method comprising the steps of
  providing a manual actuator device, operable by means of a lever and/or pedal, operatively connected to at least a first braking device acting on a brake disc or drum, so as to exercise a braking action,
  providing an automatic actuator device, operatively connected to said manual actuator device and/or to said first braking device,
  providing at least one command panel which supervises the functioning of the braking system, said command panel being operatively connected to the automatic actuator device, wherein, when the manual actuator device is operated, the panel commands the operation of the automatic actuator device so as to be able to:

increase the overall braking action of the braking system, further operating the first braking device or further braking devices provided in said system and acting on further brake discs or drums, control the braking, action of the braking system so as not to further operate the first braking device or further braking devices of the system, reduce the overall braking action imposed by means of the manual actuator device, directly countering the thrust action exercised on the lever and/or on the pedal.

DESCRIPTION OF THE DRAWINGS

Further characteristics and advantages of the present invention will be more clearly comprehensible from the description given below of its preferred and non-limiting embodiments, wherein.

The elements or parts of elements common to the embodiments described below will be indicated using the same reference numerals.

DETAILED DESCRIPTION

Figure 1:
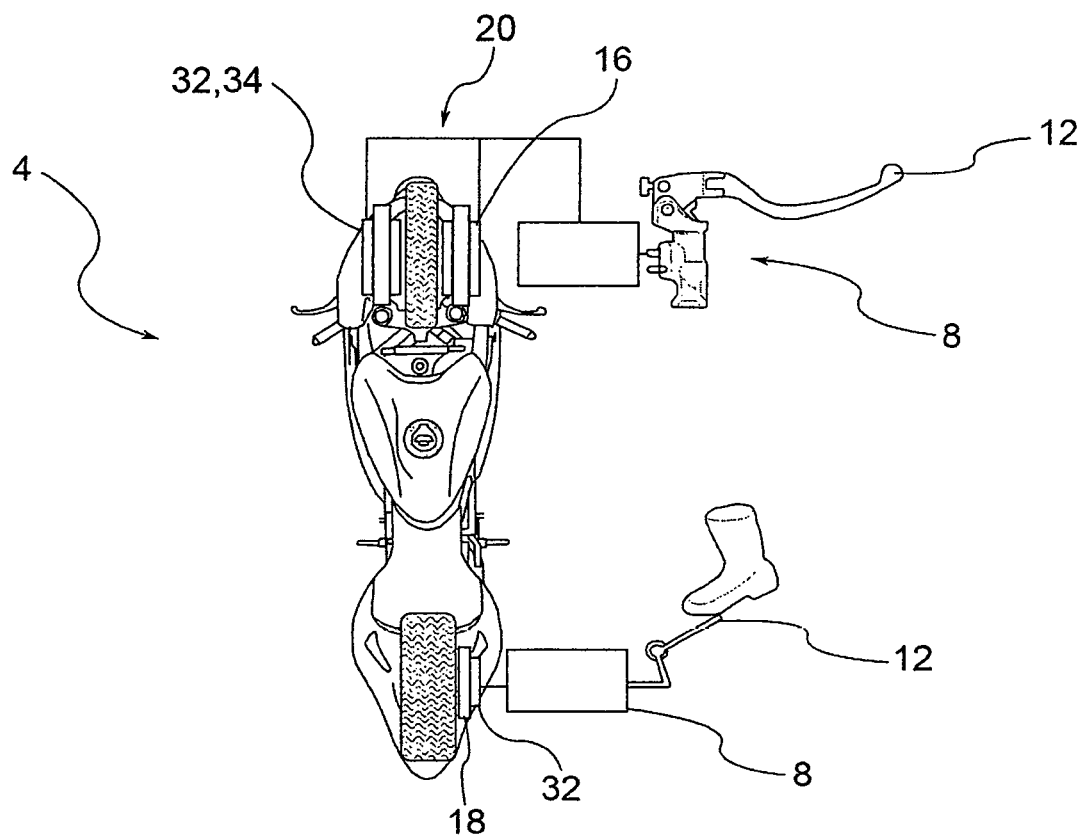
FIG. 1 is a schematic view of a braking system according to one embodiment.
Figure 2:
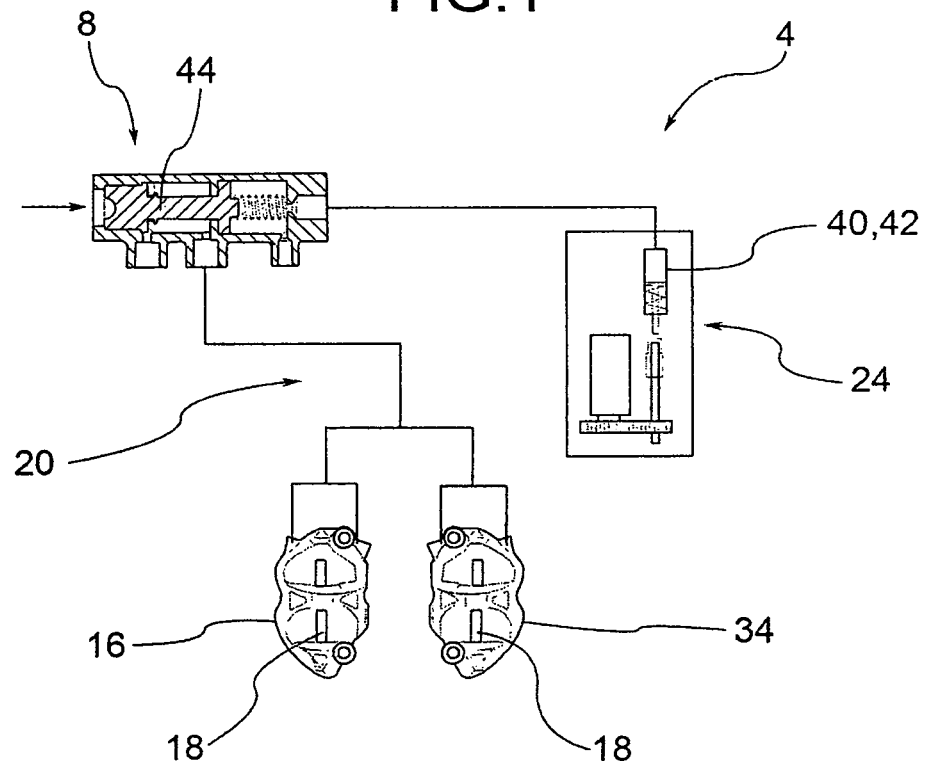
FIG. 2 is a schematic view of a braking system according to another embodiment.
Figure 3:
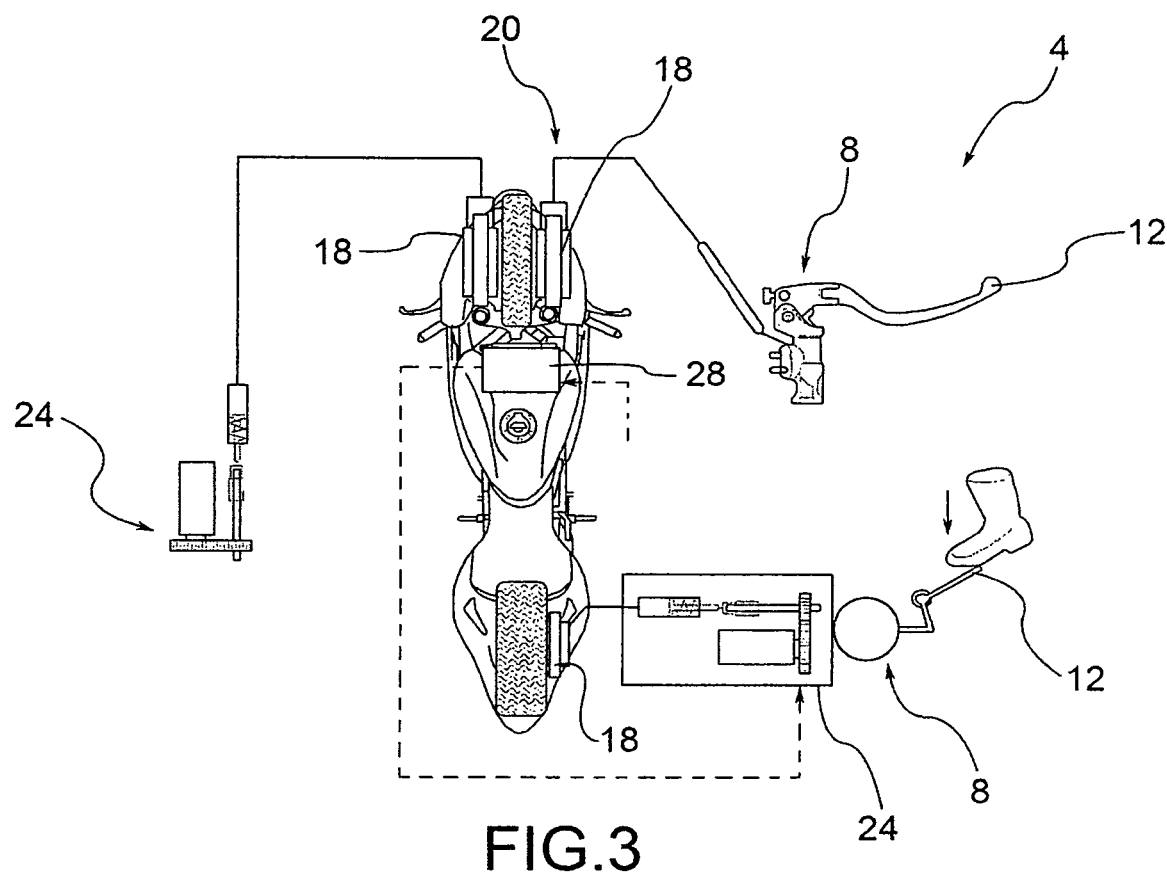
FIG. 3 is a schematic view of a braking system according to another embodiment.
Figure 4:
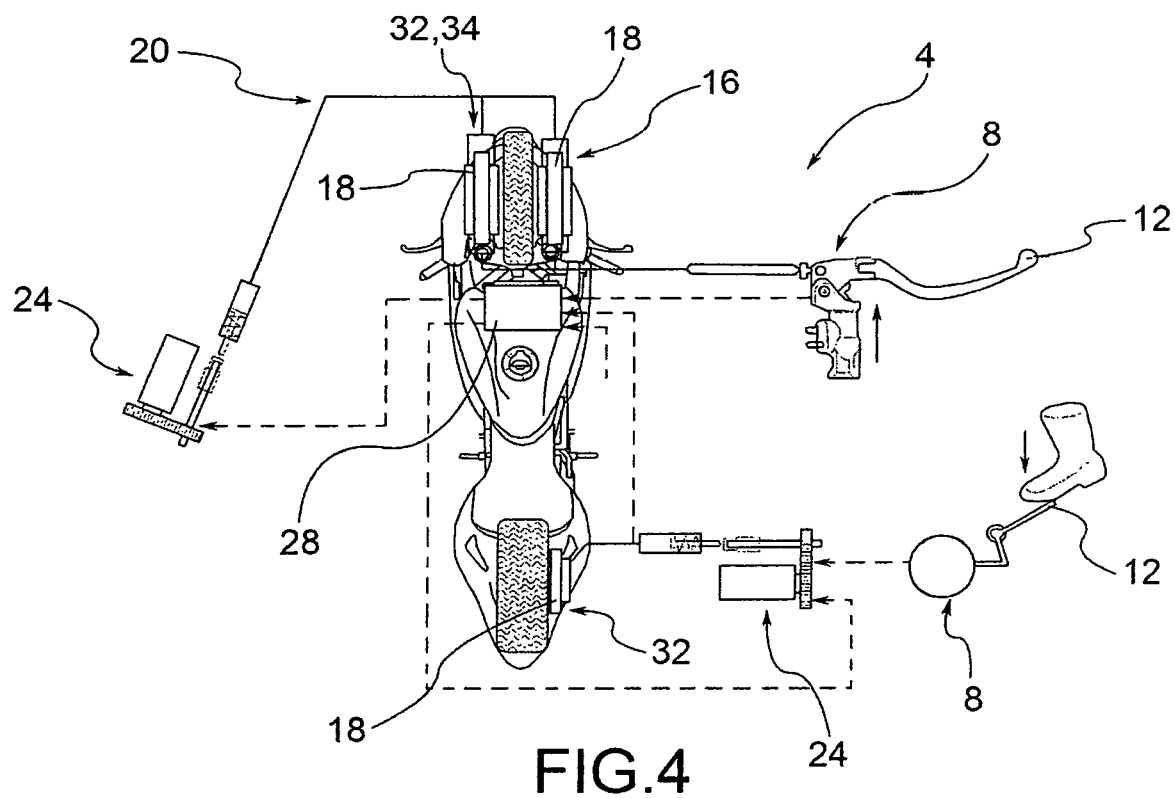
FIG. 4 is a schematic view of a braking system according to another embodiment.
Figure 5:
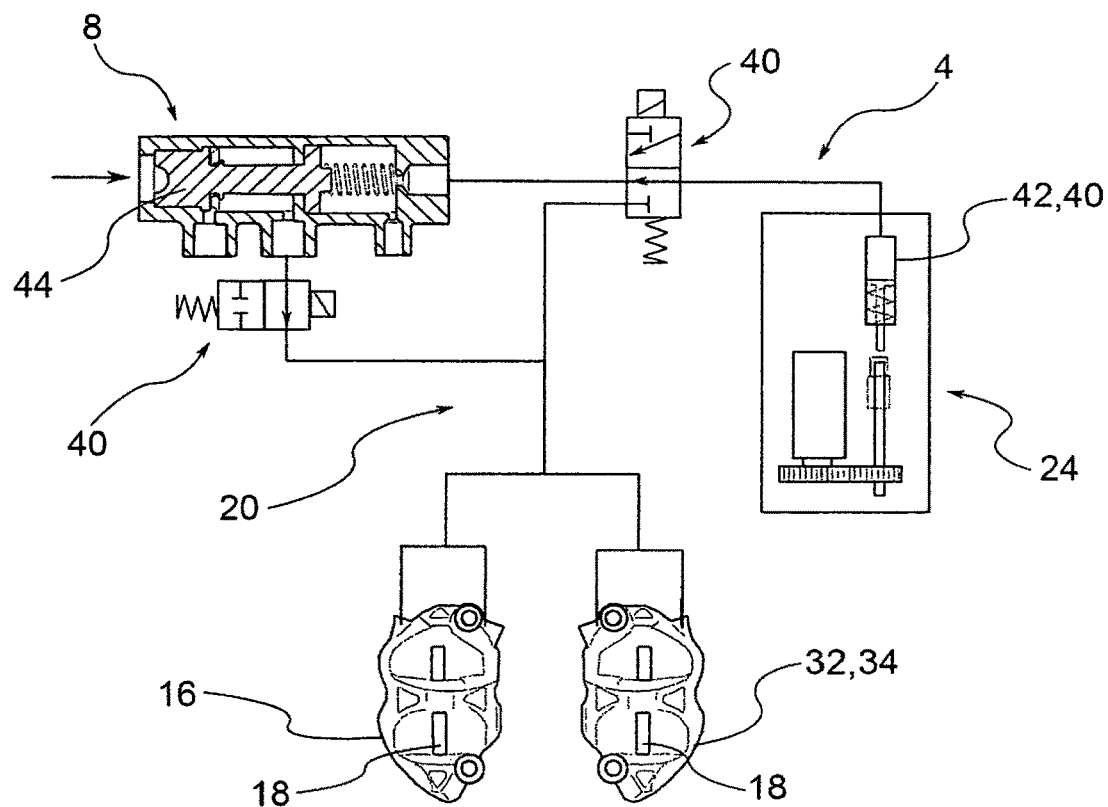
FIG. 5 is a schematic view of a braking system according to another embodiment.
Figure 6:
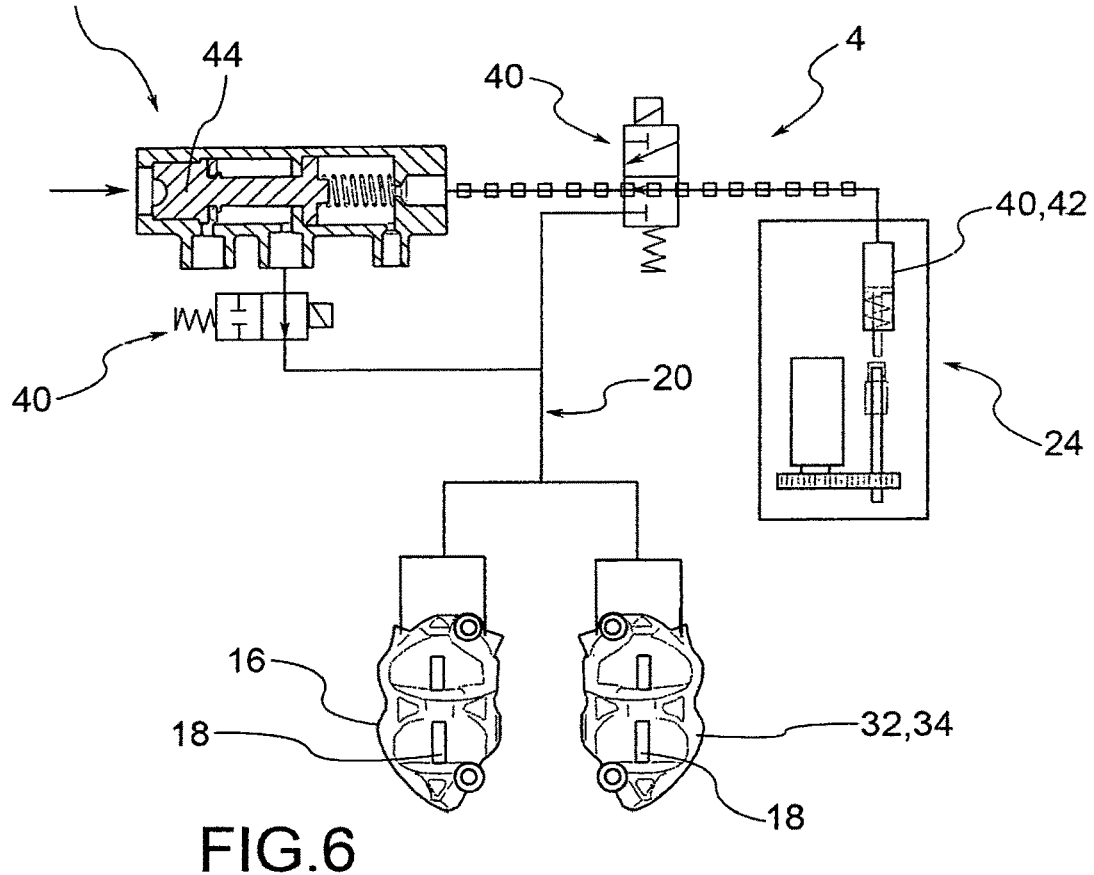
FIG. 6 is a schematic view of a braking system according to another embodiment.
Figure 7:
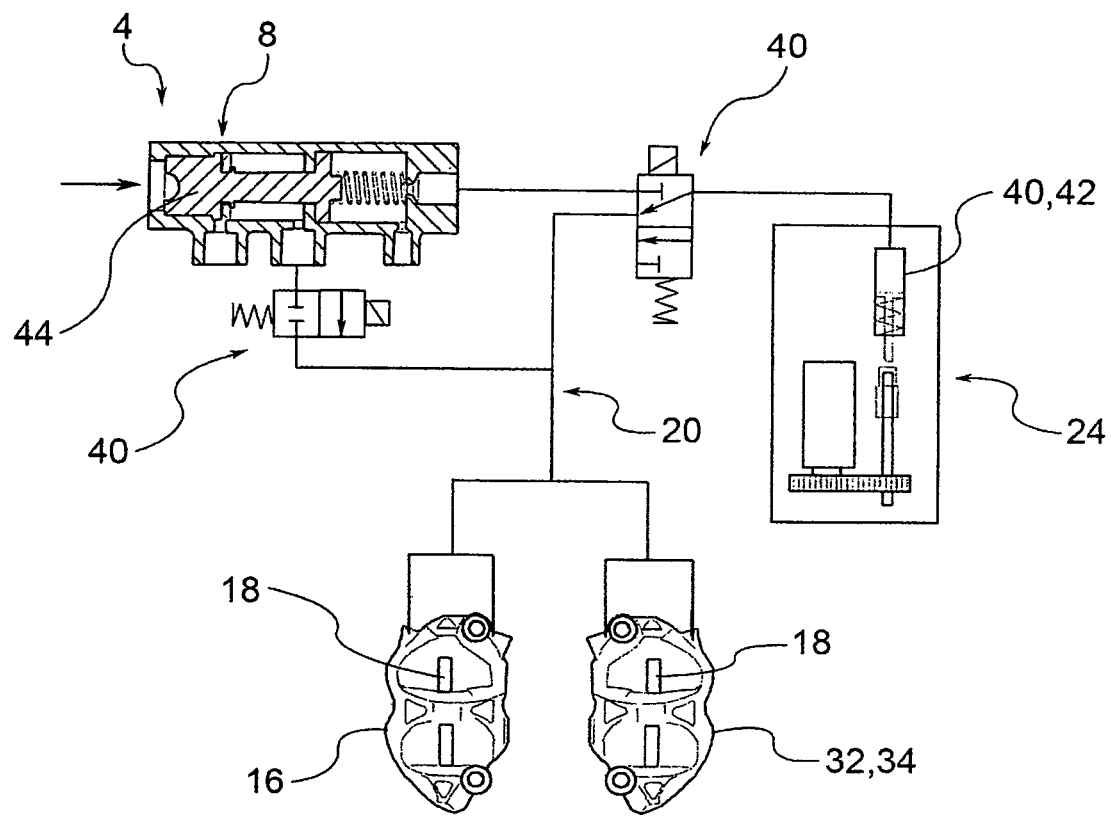
FIG. 7 is a schematic view of a braking system according to another embodiment.
Figure 8:
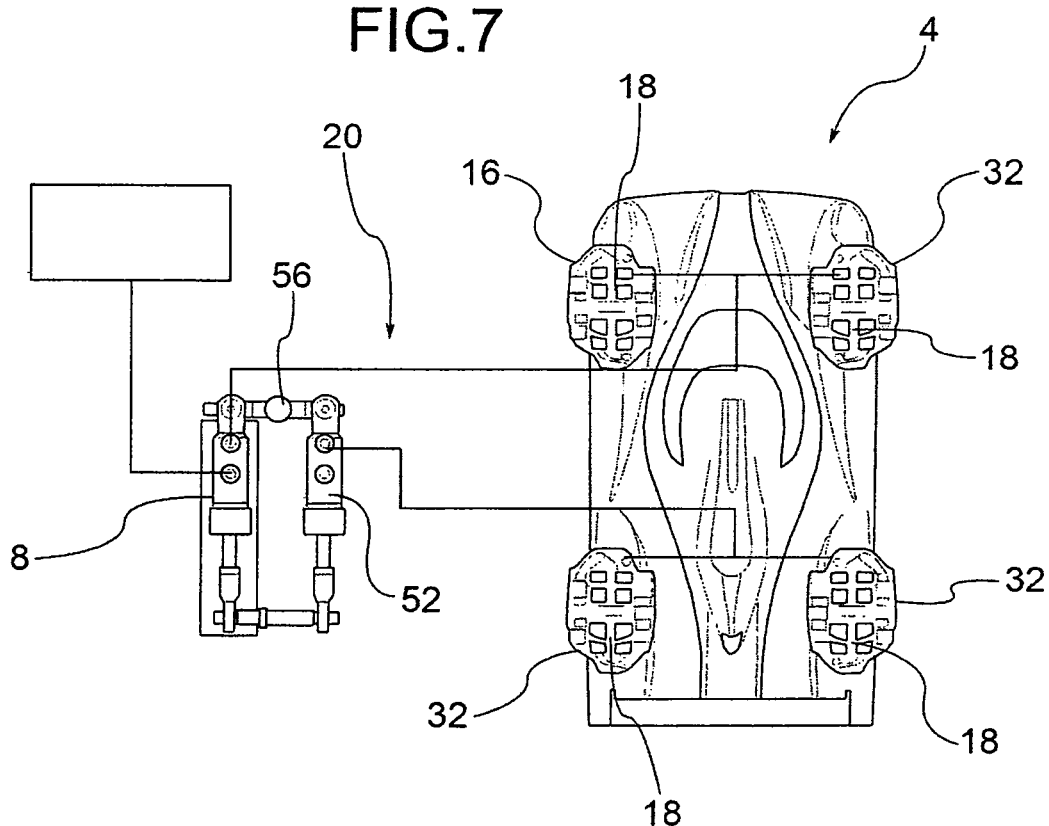
FIG. 8 is a schematic view of a braking system according to another embodiment.

With reference to the aforementioned figures, reference numeral 4 globally denotes a braking system for vehicles.

The definition of vehicle should be understood in a non-limiting, manner, meaning preferably, but not exclusively, motor vehicles and/or vehicles.

The braking system 4 comprises a manual actuator device 8, operable by means of a lever and/or pedal 12, operatively connected to at least a first braking device 16 acting on a brake disc or drum 18, so as to exert a braking action. The first braking device 16 is for example a caliper for a disc brake, acting on an associated brake disc, or a drum brake comprising one or more shoes acting on an associable drum, in a known manner.

For example, the manual actuator device 8 is a hydraulic pump, operable by means of the lever or pedal 12, operatively connected to the first braking device 16 by means of a hydraulic circuit 20 containing liquid pressurised by the hydraulic pump. It is also possible to provide for different operators of the first braking device 16, which are for example mechanical, electrical or electro/mechanical operators. The first manual actuator device may comprise not a hydraulic pump but a mechanical, electrical or electro/mechanical device operating the associable first braking device 16.

The system 4 comprises an automatic actuator device 24, operatively connected to said manual actuator device 8 and/or to said first braking device 16, and at least a command panel 28 which supervises the operation of the braking system 4.

The command panel 28 is operatively connected to the automatic actuator device 24 and is programmed so that when the manual actuator device 8 is operated, the panel commands the operation of the automatic actuator device 24 so as to be able to:

generate a braking action or increase the overall braking action of the braking system 4, operating and/or increasing the operation of the first braking device 16 or further braking devices 32, such as at least a second braking device 34, for example provided in said system and acting on further brake discs or drums 18, control the braking action of the braking system 4 so as not to further operate the first braking device 16 or further braking devices 32 of the system 4, reduce the overall braking action imposed by means of the manual actuator device 8, directly countering the thrust action exercised on the lever and/or on the pedal 12.

As further explained below, 'increasing' the overall braking action means that the braking system 4, under the supervision of the command panel 28, is able to increase the braking action of the first braking device 16 or the additional braking devices, compared to the braking action requested manually by the user through the operation of the lever or pedal 12. The increase of the braking action should be understood in a global sense as braking of the associable vehicle; it is therefore possible that the overall braking action is increased by operating for example a second braking device 34 not controlled by the manual actuator device 8, by means of the lever or pedal 12.

The 'control' of the braking action of the brake system 4, is understood to mean that the command panel 28 is capable of limiting the overall braking action of the system, so as not to further operate the first braking device 16 or additional braking devices 32 of the system, despite the user's request for additional braking power from the system 4, using the lever or pedal 12 of the manual actuator device 8.

A reduction of the overall braking action imposed by the manual actuator device 8, is taken to mean that the control unit is able to reduce the braking action acting on the first and/or second braking device in order to reduce the braking capacity, even counter to the braking request imposed by the user by means of the lever or pedal 12 of the manual actuator device 8.

According to a possible embodiment, the command panel 28 is programmed to command the automatic actuator device 24 so as to operate the first braking device 16 simultaneously with the manual operation imposed by the manual actuator device 8 or by further braking devices 32 provided in said system, when, following the manual operation of the manual actuator device 8, no blocking phenomena of the brake disc or drum 18 occur.

According to one embodiment, the command panel 28 is programmed to command the automatic actuator device 24 so as not to operate the first braking device 16 or further braking devices 32 provided in the system 4, when, following the manual operation of the manual actuator device 8, blocking phenomena of the brake disc or drum 18 occur.

According to a possible embodiment, the command panel 28 is programmed to command the automatic actuator device 24 so as to directly contrast the action of the manual actuator device 8 opposing the thrust action of the lever or pedal 12, when, following the operation of the manual actuator device 8, blocking phenomena of the brake disc or drum 18 occur.

According to a possible embodiment, the manual actuator device 8 is operatively connected to at least a first pusher of the first braking device 16 and the automatic actuator device 24 is operatively connected to at least a second pusher of the first braking device 16, said first and second pushers operating on the same brake disc or drum 18.

Pusher is understood to mean a piston, in the case of the braking device 16, 32, 34 comprising a caliper disc brake or a brake shoe, in the case of the braking device 16, 32, 34 comprising a drum.

According to a further embodiment, the manual actuator device 8 is operatively connected to at least a first pusher of the first braking device 16 and the automatic actuator device 24 is operatively connected to at least a second pusher of a second braking device 34, said first and second pushers acting on separate brake discs or drums 18 mechanically connected in rotation to each other.

Brake discs or drums 18 mechanically connected to each other in rotation is understood to mean that said brake discs or drums are associated to the same wheel or axle of the wheel so as to exert a concordant braking torque on said axle or wheel.

According to a further possible embodiment, the manual actuator device 8 is operatively connected to at least a first pusher of the first braking device 16 and the automatic actuator device is operatively connected to at least a second pusher of a second braking device 34, said first and second pushers operating on separate brake discs or drums 18 mechanically separate from each other and rotatably connected to different wheels of an associable vehicle.

According to a possible embodiment of the present invention, the command panel 28 is programmed to command the automatic actuator device 24 so as to operate the second braking device 34 so as to stabilise the vehicle, following the manual operation of the manual actuator device 8 acting on the first braking device 16.

According to one embodiment, the automatic actuator device 24 comprises contrast means 40 acting in opposition to the thrust of the lever or pedal 12.

For example, said contrast means 40 act on the lever or pedal 12 so as to oppose the increase of the stroke of the lever or pedal imposed by the user or to reduce said stroke imposed by the user.

According to a possible embodiment, the lever or pedal 12 pushes a piston 44 in an operating stroke or operating direction, the piston 44 being fluidically connected to a hydraulic operating circuit 20 of at least a first pusher of the first braking device 16, and wherein the contrast means 40, when operated, interrupt the fluidic connection between the piston 44 and the at least one first pusher. The interruption of said fluidic connection in fact prevents the user from being able to increase the braking action of the circuit.

According to a further embodiment, the lever or pedal 12 pushes a piston 44 fluidically connected to a hydraulic operating circuit 20 of at least a first pusher of the first braking device 16, and the contrast means 40, when operated, exert a thrust on the piston 44 in opposition to the operating direction.

For example the contrast means 40 comprise a hydraulic device 42 which generates pressure acting on the piston 44 in opposition to the operating direction caused by the movement of the lever or pedal 12.

According to a further embodiment, the contrast means 40 comprise mechanical devices connected to the lever or pedal 12 or to kinematisms connected to the lever or pedal 12 so as to exercise a counter action such as to prevent the increase of the operating stroke or to reduce said stroke.

According to a further embodiment, said contrast means 40 are predisposed so as to exclude the manual operation of the braking devices 16, 32, 34 by the user, and to command the operation of the first braking device 16 or further braking devices 32, 34 of the system 4 so as to stabilise the dynamics of the associable vehicle, regardless of the manual operation of said pedal or lever 12 by the manual actuator device 8.

For example, the contrast means 40 are configured so as to exclude the hydraulic connection between the manual actuator device 8 and the braking devices 16, 32, 34, and to hydraulically connect the braking devices 16, 32, 34 exclusively to at least one automatic actuator device 24 so as to command the braking devices 16, 32, 34 for the dynamic stabilisation of the associable vehicle, preventing the manual operation of the braking devices.

In other words, the contrast means can be configured as diverters which disconnect the braking devices 16, 32, 34 from the manual actuator device 8, and connect them to the automatic actuator device in order to permit the automatic operation of the braking devices to dynamically stabilize the vehicle regardless of the manual action exerted by the user on the lever or pedal 12.

According to a further possible, embodiment, the braking system 4 comprises at least a second manual actuator device 52, operatively connected to the first manual actuator device 8 by means of an interposed braking balancing device 56, so as to be operated when the first manual actuator device 8 is operated, the second manual actuator device 52, operating at least a second braking device 34 acting on a drum brake disc 18 on a second axle of the associable vehicle, separate from a first vehicle axle on which the first braking device 16 acts, operated by the first manual actuator device 8.

The automatic actuator device 24, by means of said command panel 28, commands the adjustment of the balancing device 56 so as to regulate and vary the operation of the second manual actuator device 52 in relation to the operation of the first manual actuator device 8. It is thus possible to modify the distribution of braking between the various braking devices 16, 34 acting on separate axles of the vehicle; this way one can modify for example the braking distribution between the front axle and the rear axle of a motor vehicle in order to customize the brake balance or optimize the stability control of the vehicle during the braking phase.

As may be appreciated from the description, the braking system according to the invention makes it possible to overcome the drawbacks of the prior art.

In particular, the user always has the direct control of at least a portion of the hydraulic system connected to the braking devices, and consequently always has the sensation and direct control of said system or of at least a portion thereof, even when the system does not intervene to correct the braking request or to dynamically stabilise the vehicle.

The user thus always has the sensation of the effective pressure exerted on at least a part of the braking system given that:

when the control system does not intervene to prevent the blocking of a wheel or to correct the set-up of the vehicle, the system exerts exactly the pressure imposed manually by the user (i.e. the same pressure that the user imposes directly on at least a portion of the system by pressing the lever or pedal), when the control system intervenes correct braking, for example to avoid an onset of blocking, the control action is immediate and directly opposes the manual action exerted by the user who thus clearly perceives the intervention of the control system. In systems in which the control is exerted independently on different actuators and/or wheels to the actuators controlled directly by the user, the latter still has an improved feeling of braking. In fact, the direct control even of a single portion (actuator) of the braking system provides the user with an improved sensation of the dynamic behaviour of the vehicle and thus allows him to sense the onset of wheel blocking.

This way, the user always has the feeling of total control of the vehicle.

A person skilled in the art may make numerous modifications and variations to the braking systems described above so as to satisfy contingent and specific requirements while remaining within the sphere of protection of the invention as defined by the following claims.

The invention claimed is:

1. A braking system for vehicles, comprising;
    a manual actuator device, operable by means of a lever and/or pedal, operatively connected to at least a first braking device acting on a brake disc or drum, so as to exercise a braking action,
    an automatic actuator device, operatively connected to said manual actuator device and/or to said first braking device,
    at least one command panel which supervises the functioning of the braking system, said command panel being operatively connected to the automatic actuator device and being programmed so that when the manual actuator device is operated, the panel commands the operation of the automatic actuator device so as to be able to:
    generate a braking action or increase the overall braking action of the braking system, operating and/or increasing the operation of the first braking device or further braking devices provided in said system and acting on further brake discs or drums,
    controlling the braking action of the braking system so as not to further operate the first braking device or further braking devices of the system,
    reducing the overall braking action imposed by means of the manual actuator device countering the braking action provided by the manual actuator device;
    wherein the command panel is programmed to command the automatic actuator device so as to operate the first braking device simultaneously with the manual operation imposed by the manual actuator device or by further braking devices provided in said system, when, following the manual operation of the manual actuator device, no blocking phenomena of the brake disc or drum occur;
    wherein the automatic actuator device comprises contrast means acting in opposition to the braking action of the manual actuator device;
    wherein the manual actuator device is operatively connected to at least a first pusher of the first braking device via a first fluid line and the automatic actuator device is operatively connected to at least a second pusher of the first braking device via a second fluid line, said first and second pusher operating on the same brake disc or drum.

2. The braking system for vehicles according to claim 1, wherein the command panel is programmed to command the automatic actuator device so as not to operate the first braking device or further braking devices provided in said system, when, following the manual operation of the manual actuator device, blocking phenomena of the brake disc or drum occur.

3. The braking system for vehicles according to claim 1, wherein the command panel is programmed to command the automatic actuator device so as to oppose the action of the manual actuator device, opposing the thrust action of the lever or pedal, when, following the operation of the manual actuator device, blocking phenomena of the brake disc or drum occur.

4. The braking system for vehicles according to claim 1, wherein the command panel is programmed to command the automatic actuator device so as to generate a braking action by operating the first braking device or further braking devices of the system, so as to stabilise the dynamics of the associable vehicle, and excluding the manual operation of the braking devices by the user.

5. The braking system for vehicles according to claim 1, wherein the manual actuator device is operatively connected to the at least one first pusher of the first braking device and the automatic actuator device is operatively connected to at least a second pusher of a second braking device.

6. The braking system for vehicles according to claim 5, wherein the command panel is programmed to command the automatic actuator device so as to operate the second braking device so as to stabilise the vehicle, following the manual operation of the manual actuator device acting on the first braking device.

7. The braking system for vehicles according to claim 1, wherein said contrast means act on the lever or pedal so as to oppose the increase in the operating stroke of the lever or pedal or to reduce said operating stroke.

8. The braking system for vehicles according to claim 1, wherein the lever or pedal pushes a piston fluidically connected to a hydraulic operating circuit of at least the first pusher of the first braking device, and wherein the contrast means, when operated, interrupt the fluidic connection between the piston and the at least one first pusher.

9. The braking system for vehicles according to claim 1, wherein the lever or pedal pushes a piston fluidically connected to a hydraulic operating circuit of at least the first pusher of the first braking device, and wherein the contrast means, when operated, exercise a thrust on the piston in opposition to the operating stroke and direction.

10. The braking system for vehicles according to claim 1, wherein said contrast means comprise a hydraulic device which generates pressure acting on a piston in opposition to the operating stroke due to the movement of the lever or pedal wherein the automatic actuator device comprises the contrast means acting in opposition to the thrust of the lever or pedal.

11. The braking system for vehicles according to claim 1, wherein said contrast means exclude the manual operation of the further braking devices by the user, and command the operation of the first braking device or further braking devices of the system, so as to stabilise the dynamics of the associable vehicle, regardless of the manual action of the manual actuator device on said pedal or lever.

12. The braking system for vehicles according to claim 1, wherein said contrast means exclude the hydraulic connection between the actuator device and the braking devices, and hydraulically connect the further braking devices to at least one automatic actuator device so as to command the braking devices for the dynamic stabilisation of the associable vehicle, preventing the manual operation of the further braking devices.

13. The braking system for vehicles according to claim 1, wherein the first braking device or the further braking devices comprise a calliper of the brake disc and/or the drum.

14. The braking system for vehicles according to claim 1, wherein said first and second fluid lines are not connected.

15. A method of controlling a braking system for vehicles, comprising the steps of:
- providing a manual actuator device, operable by means of a lever and/or pedal, operatively connected to at least a first braking device acting on a brake disc or drum, so as to exercise a braking action,
- providing an automatic actuator device, operatively connected to said manual actuator device and/or to said first braking device,
- providing at least one command panel which supervises the functioning of the braking system, said command panel being operatively connected to the automatic actuator device,
- wherein, when the manual actuator device is operated, the panel commands the operation of the automatic actuator device so as to be able to:
- increase the overall braking action of the braking system, further operating the first braking device or further braking devices provided in said system and acting on further brake discs or drums,
- control the braking action of the braking system so as not to further operate the first braking device or further braking devices of the system,
- reducing the overall braking action imposed by means of the manual actuator device countering the braking action provided by the manual actuator device;
- wherein the command panel is programmed to command the automatic actuator device so as to operate the first braking device simultaneously with the manual operation imposed by the manual actuator device or by further braking devices provided in said system, when, following the manual operation of the manual actuator device, no blocking phenomena of the brake disc or drum occur;
- wherein the automatic actuator device comprises contrast means acting in opposition to the trust of the manual actuator device;
- wherein the manual actuator device is operatively connected to at least a first pusher of the first braking device via a first fluid line and the automatic actuator device is operatively connected to at least a second pusher of the first braking device via a second fluid line, said first and second pusher operating on the same brake disc or drum, wherein said first and second fluid lines are not connected.

* * * * *